United States Patent
Mori et al.

(10) Patent No.: US 12,455,487 B2
(45) Date of Patent: Oct. 28, 2025

(54) OPTICAL MODULATOR AND METHOD OF MANUFACTURING OPTICAL MODULATOR

(71) Applicant: Sumitomo Electric Industries, Ltd., Osaka (JP)

(72) Inventors: Hiroki Mori, Osaka (JP); Naoya Kono, Osaka (JP); Mitsuru Ekawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 517 days.

(21) Appl. No.: 17/833,942

(22) Filed: Jun. 7, 2022

(65) Prior Publication Data
US 2022/0397802 A1  Dec. 15, 2022

(30) Foreign Application Priority Data
Jun. 11, 2021  (JP) ................ 2021-098079

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01); *G02F 2202/102* (2013.01)

(58) Field of Classification Search
CPC ... G02F 1/212; G02F 1/2257; G02F 2202/102
See application file for complete search history.

(56) References Cited

U.S. PATENT DOCUMENTS

| | | | |
|---|---|---|---|
| 5,082,342 A | 1/1992 | Wight et al. | |
| 6,539,130 B2* | 3/2003 | Kondo | G02F 1/035 385/5 |
| 6,924,918 B2* | 8/2005 | Otake | G02F 1/2257 359/254 |
| 7,305,167 B2* | 12/2007 | Hutchinson | G02B 6/131 385/131 |

(Continued)

FOREIGN PATENT DOCUMENTS

JP  2004-102160 A  4/2004

OTHER PUBLICATIONS

Ozaki et al., High-speed Modulator for Next-generation Large-capacity Coherent Optical Networks, NTT Technical Review, V. 16, N. 4, 2018 (Year: 2018).*

(Continued)

*Primary Examiner* — Peter Radkowski
(74) *Attorney, Agent, or Firm* — Volpe Koenig

(57) ABSTRACT

An optical modulator includes a first mesa waveguide extending in a first direction, and a second mesa waveguide. The first mesa waveguide includes a p-type first semiconductor layer disposed over a substrate, a core layer disposed over the first semiconductor layer, a p-type second semiconductor layer disposed over the core layer, and an n-type third semiconductor layer disposed over the core layer. The second semiconductor layer and the third semiconductor layer are arranged adjacent to each other in the first direction. An electrode is disposed over the third semiconductor layer. A joining surface between the second semiconductor layer and the third semiconductor layer is inclined with respect to a surface orthogonal to the first direction.

11 Claims, 16 Drawing Sheets

(56) References Cited

U.S. PATENT DOCUMENTS

| | | | | |
|---|---|---|---|---|
| 7,405,421 | B2* | 7/2008 | Hashimoto | B82Y 20/00 257/14 |
| 7,579,630 | B2* | 8/2009 | Hashimoto | B82Y 20/00 257/85 |
| 7,678,594 | B2* | 3/2010 | Katsuyama | H01L 22/26 438/46 |
| 7,723,138 | B2* | 5/2010 | Katsuyama | H01S 5/0265 438/32 |
| 7,781,245 | B2* | 8/2010 | Kishi | B82Y 20/00 438/483 |
| 8,021,985 | B2* | 9/2011 | Katsuyama | H01S 5/2275 438/689 |
| 8,642,943 | B2* | 2/2014 | Mori | B82Y 20/00 438/73 |
| 9,229,293 | B2* | 1/2016 | Kono | G02F 1/025 |
| 9,435,950 | B2* | 9/2016 | Kono | G02F 1/025 |
| 10,254,624 | B2* | 4/2019 | Ogiso | G02F 1/225 |
| 11,126,058 | B1 | 9/2021 | Ogiso et al. | |
| 2001/0007601 | A1* | 7/2001 | Kondo | G02F 1/035 385/2 |
| 2004/0052491 | A1* | 3/2004 | Otake | G02F 1/2257 385/131 |
| 2005/0220391 | A1* | 10/2005 | Hashimoto | H01S 5/026 385/129 |
| 2007/0215904 | A1* | 9/2007 | Hashimoto | B82Y 20/00 257/192 |
| 2007/0237482 | A1* | 10/2007 | Hutchinson | G02B 6/131 385/129 |
| 2008/0003704 | A1* | 1/2008 | Katsuyama | B82Y 20/00 257/E21.085 |
| 2009/0117676 | A1* | 5/2009 | Katsuyama | G02F 1/015 438/496 |
| 2009/0209055 | A1* | 8/2009 | Kishi | H01S 5/3434 438/47 |
| 2011/0159620 | A1* | 6/2011 | Katsuyama | B82Y 20/00 257/E33.024 |
| 2013/0048838 | A1* | 2/2013 | Mori | B82Y 20/00 438/73 |
| 2013/0209023 | A1 | 8/2013 | Prosyk | |
| 2014/0021160 | A1 | 1/2014 | Kitamura et al. | |
| 2015/0043867 | A1* | 2/2015 | Kono | G02F 1/025 438/31 |
| 2015/0331298 | A1* | 11/2015 | Yagi | G02F 1/2257 385/2 |
| 2016/0011439 | A1 | 1/2016 | Kitamura et al. | |
| 2016/0025922 | A1* | 1/2016 | Kono | G02B 6/1228 385/2 |
| 2018/0164654 | A1* | 6/2018 | Ogiso | G02F 1/2257 |
| 2022/0066280 | A1 | 3/2022 | Kono | |

OTHER PUBLICATIONS

United States Office Action issued on Aug. 24, 2023 for U.S. Appl. No. 17/375,259.
United States Office Action issued on Mar. 16, 2023 for U.S. Appl. No. 17/375,259.

* cited by examiner

Fig.15
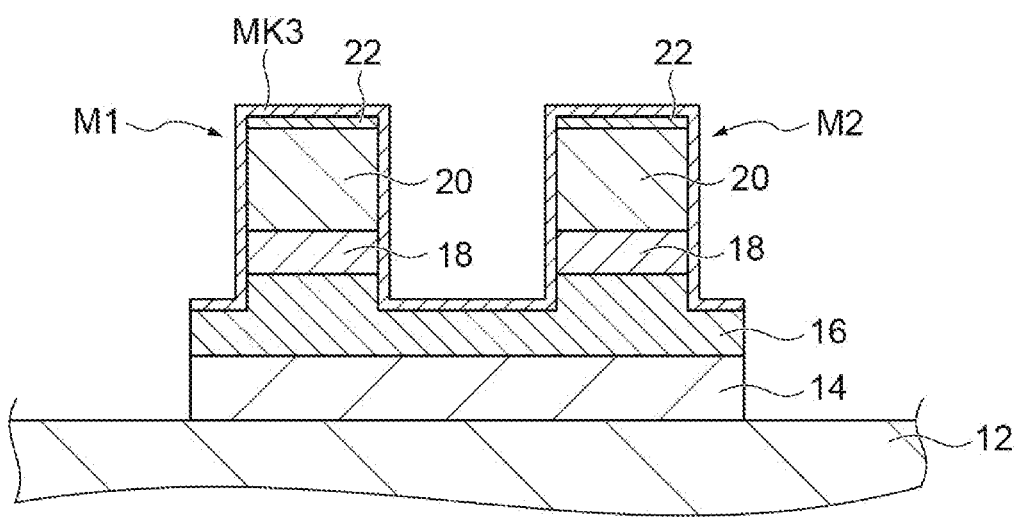
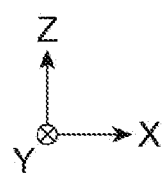

OPTICAL MODULATOR AND METHOD OF MANUFACTURING OPTICAL MODULATOR

CROSS REFERENCE TO RELATED APPLICATIONS

This application claims priority based on Japanese Patent Application No. 2021-098079 filed on Jun. 11, 2021, and the entire contents of the Japanese patent application are incorporated herein by reference.

TECHNICAL FIELD

The present disclosure relates to an optical modulator and a method of manufacturing an optical modulator.

BACKGROUND

JP 2004-102160A discloses a Mach-Zehnder optical modulator including two mesa waveguides. Each mesa waveguide includes a lower cladding layer provided on a substrate, a core layer provided on the lower cladding layer, and an upper cladding layer provided on the core layer. A plurality of modulation electrodes arranged in the extending direction of the mesa waveguide are provided on each mesa waveguide. Between adjacent modulation electrodes of the plurality of modulation electrodes, the upper cladding layer has a separating portion made of an i-type semiconductor.

SUMMARY

An optical modulator according to an aspect of the present disclosure includes a first mesa waveguide extending in a first direction, and a second mesa waveguide. The first mesa waveguide includes a p-type first semiconductor layer disposed over a substrate, a core layer disposed over the first semiconductor layer, a p-type second semiconductor layer disposed over the core layer, and an n-type third semiconductor layer disposed over the core layer. The second semiconductor layer and the third semiconductor layer are arranged adjacent to each other in the first direction. An electrode is disposed over the third semiconductor layer. A joining surface between the second semiconductor layer and the third semiconductor layer is inclined with respect to a surface orthogonal to the first direction.

A method of manufacturing an optical modulator according to an aspect of the present disclosure is a method of manufacturing an optical modulator including a first mesa waveguide and a second mesa waveguide extending in a first direction. The method includes forming a semiconductor stack including a first semiconductor layer, a core layer, and a second semiconductor layer over a substrate, forming a recess in the second semiconductor layer by wet-etching the second semiconductor layer, forming a second conductivity-type third semiconductor layer in the recess, forming the first mesa waveguide and the second mesa waveguide by etching the second semiconductor layer, the third semiconductor layer, the core layer, and the first semiconductor layer and forming an electrode over the first mesa waveguide. The first semiconductor stacked layer is a p-type first semiconductor layer provided over the substrate. The core layer is provided over the first semiconductor layer. The second semiconductor layer is provided over the core layer. The length of the recess in the first direction decreases in a direction from an upper end toward a lower end of the recess. The electrode is formed over an n-type layer selected from the second semiconductor layer and the third semiconductor layer.

BRIEF DESCRIPTION OF THE DRAWINGS

The foregoing and other purposes, aspects and advantages will be better understood from the following detailed description with reference to the drawings.

FIG. 15 is a cross-sectional view schematically illustrating one step of the method of manufacturing the optical modulator according to the first embodiment.

DETAILED DESCRIPTION

Figure 1:
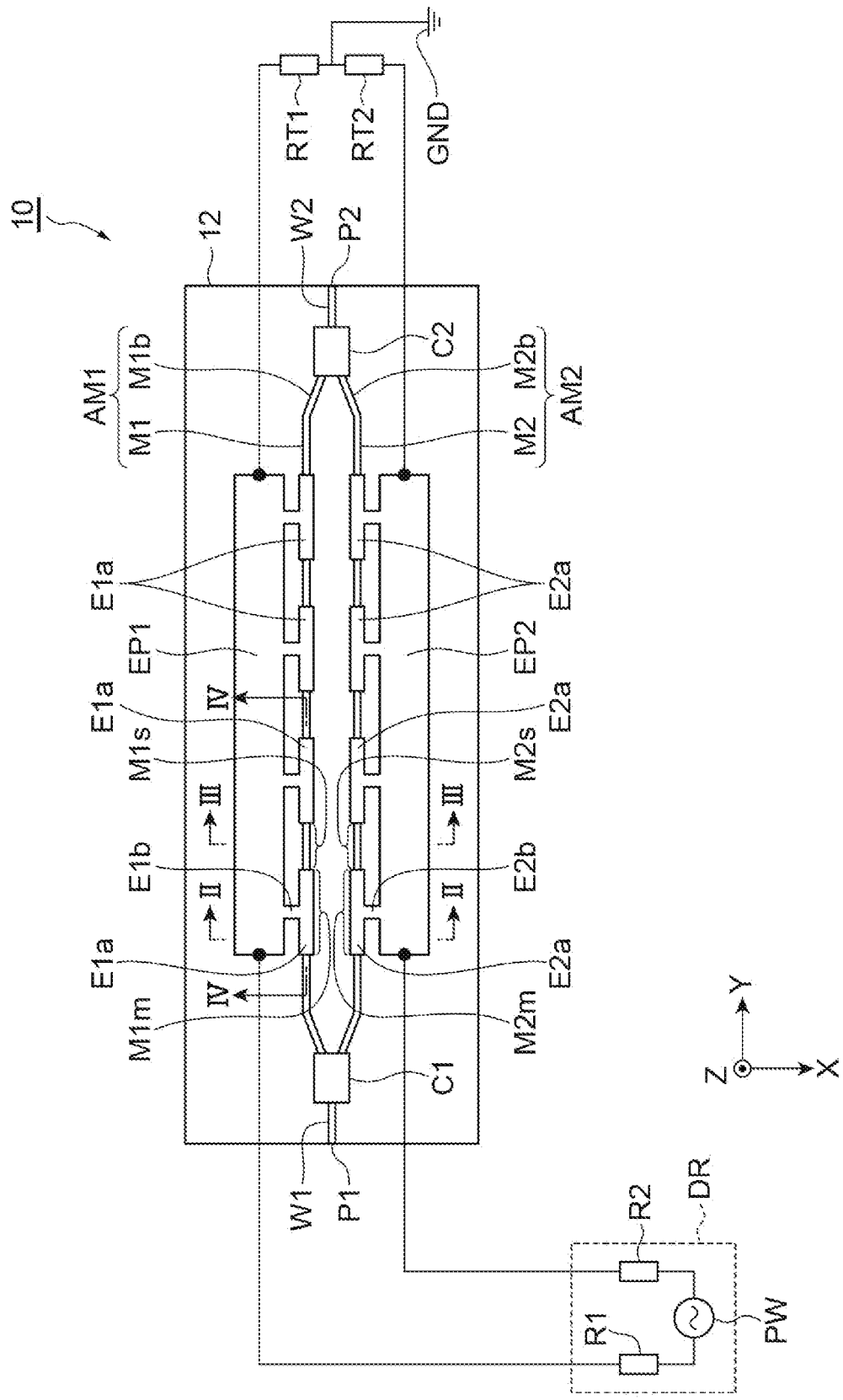
FIG. 1 is a plan view schematically illustrating an optical modulator according to a first embodiment.

When the lower cladding layer is formed of a p-type semiconductor, a p-type dopant (for example, zinc) contained in the lower cladding layer and a dopant (for example, iron) contained in the separating portion may interdiffuse. As a result, the p-type dopant diffuses into the core layer. The p-type dopant in the core may be a non-radiative recombination center.

The present disclosure provides an optical modulator capable of reducing a p-type dopant concentration in a core layer, and a method of manufacturing the optical modulator.

Description of Embodiments of the Present Disclosure

An optical modulator according to an embodiment includes a first mesa waveguide extending in a first direction, and a second mesa waveguide. The first mesa waveguide includes a p-type first semiconductor layer disposed over a substrate, a core layer disposed over the first semiconductor layer, a p-type second semiconductor layer disposed over the core layer, and an n-type third semiconductor layer disposed over the core layer. The second semiconductor layer and the third semiconductor layer are arranged adjacent to each other in the first direction. An electrode is disposed over the third semiconductor layer. A joining surface between the second semiconductor layer and the third semiconductor layer is inclined with respect to a surface orthogonal to the first direction.

According to the optical modulator of this embodiment, it is less likely for the p-type dopant in the first semiconductor layer and the p-type dopant in the second semiconductor layer to mutually diffuse. Therefore, it is possible to suppress diffusion of the p-type dopant in the first semiconductor layer and the second semiconductor layer toward the core layer. Therefore, the p-type dopant concentration of the core layer can be reduced.

The joining surface may be inclined such that a length of the third semiconductor layer in the first direction is decreased in a direction from the electrode toward the core layer. In this case, even if an electric field leakage extending from the joining surface into the p-type second semiconductor layer in the first direction occurs, the region in which the electric field spreads in the first direction can be reduced.

The p-type dopant in the second semiconductor layer may have a concentration of $1 \times 10^{16}$ cm$^{-3}$ or more. In this case, the electric field leakage length extending from the joining surface into the p-type second semiconductor layer in the first direction can be reduced.

The p-type dopant in the second semiconductor layer may have a concentration of $1 \times 10^{17}$ cm$^{-3}$ or less. In this case, optical loss due to free carrier absorption can be reduced in the second semiconductor layer.

A method of manufacturing an optical modulator according to an embodiment is a method of manufacturing an optical modulator including a first mesa waveguide and a second mesa waveguide extending in a first direction. The method includes forming a semiconductor stack including a first semiconductor layer, a core layer, and a second semiconductor layer over a substrate, forming a recess in the second semiconductor layer by wet-etching the second semiconductor layer, forming a second conductivity-type third semiconductor layer in the recess, forming the first mesa waveguide and the second mesa waveguide by etching the second semiconductor layer, the third semiconductor layer, the core layer, and the first semiconductor layer and forming an electrode over the first mesa waveguide. The first semiconductor stacked layer is a p-type first semiconductor layer provided over the substrate. The core layer is provided over the first semiconductor layer. The second semiconductor layer is provided over the core layer. The length of the recess in the first direction decreases in a direction from an upper end toward a lower end of the recess. The electrode is formed over an n-type layer selected from the second semiconductor layer and the third semiconductor layer.

According to the method of manufacturing an optical modulator of the present embodiment, the p-type dopant in the first semiconductor layer and the p-type dopant in the p-type layer selected from the second semiconductor layer and the third semiconductor layer are less likely to interdiffuse. Therefore, it is possible to suppress diffusion of the p-type dopant in the first semiconductor layer and the second semiconductor layer or the third semiconductor layer toward the core layer. Therefore, the p-type dopant concentration of the core layer can be reduced.

The third semiconductor layer may be the n-type layer. In this case, it is less likely for the p-type dopant in the p-type second semiconductor layer to diffuse toward the core layer.

In the forming a third semiconductor layer, a length of an upper surface of the third semiconductor layer in the first direction may be larger than a length of an upper surface of the second semiconductor layer in the first direction. In this case, the flatness of the upper surface of the third semiconductor layer can be improved.

Details of Embodiment of the Present Disclosure

Hereinafter, embodiments of the present disclosure will be described in detail with reference to the accompanying drawings. In the description of the drawings, the identical reference numerals are used for the same or equivalent elements, and redundant description is omitted. In the drawings, an X-axis direction, a Y-axis direction, and a Z-axis direction that intersect each other are illustrated as necessary. The X-axis direction, the Y-axis direction, and the Z-axis direction are orthogonal to each other, for example. The X-axis direction is, for example, a [0-11] direction. The Y-axis direction is, for example, a [011] direction. The Z-axis direction is, for example, a [100] direction.

In the present disclosure, the term "on" or "over" is not limited to mean that a component is in contact with another component. For example, when the first layer is disposed on or over the second layer, the first layer and the second layer may be in contact with each other or one or more layers may be disposed between the first layer and the second layer.

First Embodiment

FIG. 1 is a plan view schematically illustrating an optical modulator according to a first embodiment. An optical modulator 10 illustrated in FIG. 1 is, for example, a Mach-Zehnder modulator. Optical modulator 10 can modulate the intensity or phase of light in optical communication, for example, and generate a modulation signal. Optical modulator 10 can attenuate the light by adjusting the intensity of the light, for example.

Optical modulator 10 includes a first arm waveguide AM1 and a second arm waveguide AM2 of a Mach-Zehnder modulator. First arm waveguide AM1 includes a first mesa waveguide M1. First arm waveguide AM1 may include a pair of bent waveguides M1b optically coupled to both ends of first mesa waveguide M1, respectively. Second arm waveguide AM2 includes a second mesa waveguide M2. Second arm waveguide AM2 may include a pair of bent waveguides M2b optically coupled to both ends of second mesa waveguide M2, respectively.

First mesa waveguide M1 is provided over a substrate 12, extends along the Y-axis direction (first direction), and has a height in the Z-axis direction. Second mesa waveguide M2 extends along first mesa waveguide M1. Second mesa waveguide M2 may extend along the Y-axis direction and may have a height in the Z-axis direction. The extending direction of second mesa waveguide M2 may be different from the extending direction of first mesa waveguide M1. Specifically, the angle formed by the extending direction of first mesa waveguide M1 and the extending direction of second mesa waveguide M2 may be, for example, more than 0° and 20° or less. First mesa waveguide M1 and second mesa waveguide M2 are separated from each other in the X-axis direction.

An input end of first mesa waveguide M1 and an input end of second mesa waveguide M2 are optically coupled to an optical demultiplexer C1 via bent waveguide M1b and bent waveguide M2b, respectively. Optical demultiplexer C1 is, for example, a multi-mode interference (MMI) coupler such as a 1×2 multi-mode interference coupler. Optical demultiplexer C1 is optically coupled to the output end of an input waveguide W1. The input end of input waveguide W1 is an input port P1. Input port P1 is located at the edge of substrate 12. The light is input to input port P1.

The output end of first mesa waveguide M1 and the output end of second mesa waveguide M2 are optically coupled to an optical multiplexer C2 via bent waveguide M1b and bent waveguide M2b, respectively. Optical multiplexer C2 is, for example, an MMI coupler such as a 2×1 multimode interference coupler. Optical multiplexer C2 is optically coupled to an input end of an output waveguide W2. An output end of output waveguide W2 is an output port P2. Output port P2 is located at an edge opposite to the edge of substrate 12 where input port P1 is located. Light is output from output port P2.

First mesa waveguide M1 includes a plurality of modulating portions M1m spaced apart from each other along the Y-axis direction. A separating portion M1s is located between adjacent modulating portions of the plurality of modulating portions M1m. A wiring line E1a extending in the Y-axis direction is connected to each modulating portion M1m. Wiring line E1a is located over modulating portion M1m. Each wiring line E1a is connected to an electrode pad EP1 by a wiring line E1b. Electrode pad EP1 is located away from wiring line E1a in the X-axis direction. Electrode pad EP1 extends in the Y-axis direction over the plurality of modulating portions M1m. Wiring line E1a, wiring line E1b, and electrode pad EP1 are located over substrate 12. Wiring line E1a, wiring line E1b, and electrode pad EP1 include metals such as gold.

Second mesa waveguide M2 has the same configuration as first mesa waveguide M1. Second mesa waveguide M2 includes a plurality of modulating portions M2m spaced apart from each other along the Y-axis direction. A separating portion M2s is located between adjacent modulation portions of the plurality of modulating portions M2m. A wiring line E2a extending in the Y-axis direction is connected to each modulating portion M2m. A wiring line E2a is located over modulating portion M2m. Each wiring line E2a is connected to an electrode pad EP2 by a wiring line E2b. Electrode pad EP2 is located away from wiring line E2a in the X-axis direction. Electrode pad EP2 extends in the Y-axis direction over the plurality of modulating portions M2m. Wiring line E2a, wiring line E2b, and electrode pad EP2 are located over substrate 12. Wiring line E2a, wiring line E2b, and electrode pad EP2 include metals such as gold.

A drive circuit DR is connected to one end of electrode pad EP1 and one end of electrode pad EP2 by a wiring line. Drive circuit DR includes an alternating-current power supply PW, a resistor R1, and a resistor R2. Alternating-current power supply PW is connected to one end of electrode pad EP1 through resistor R1 by a wiring line. Alternating-current power supply PW is connected to one end of electrode pad EP2 through resistor R2 by a wiring line.

The other end of electrode pad EP1 is connected to a ground potential GND via a termination resistor RT1 by a wiring line. The other end of electrode pad EP2 is connected to ground potential GND via a termination resistor RT2 by a wiring line.

Figure 2:
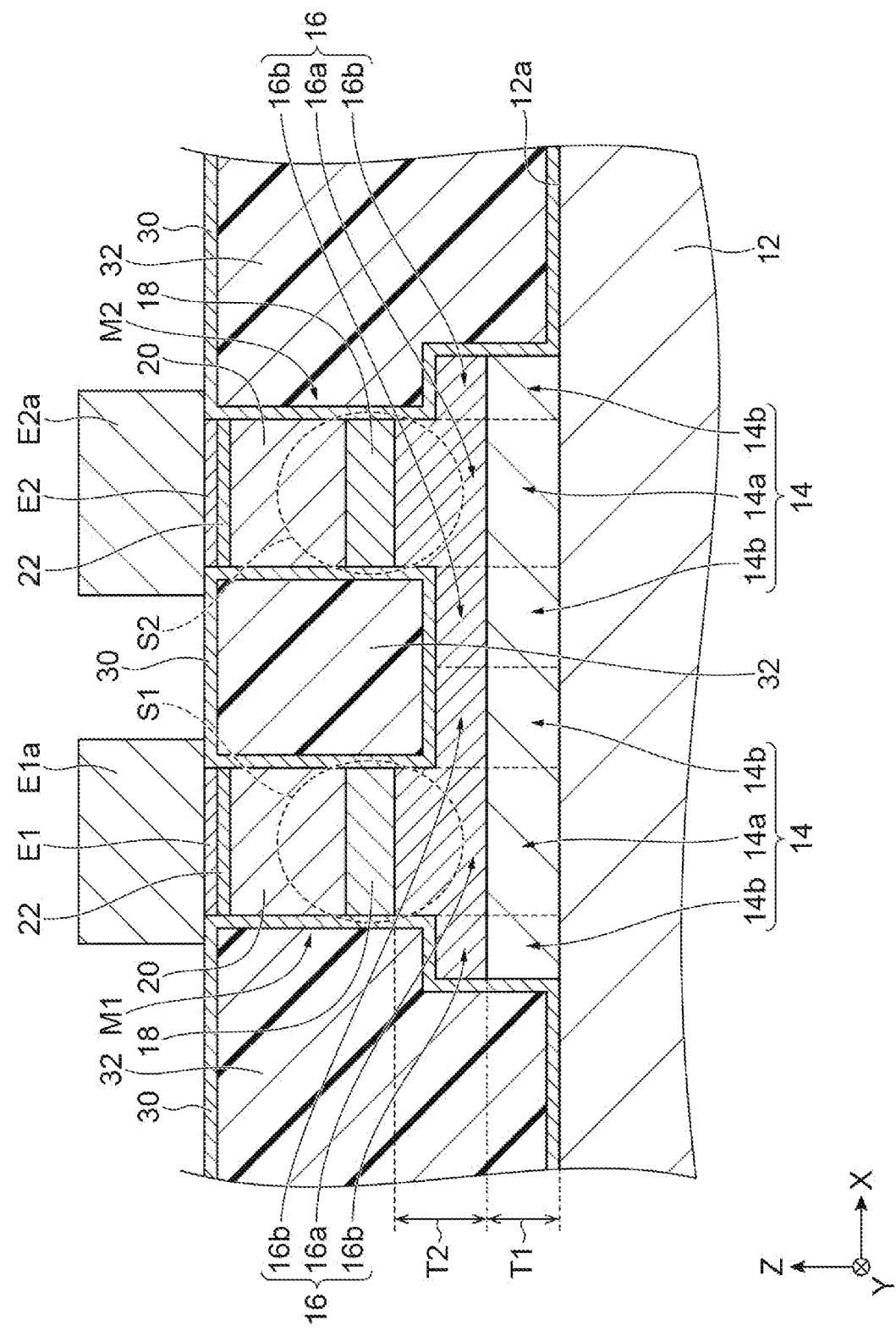
FIG. 2 is a cross-sectional view taken along line II-II of FIG. 1.
Figure 3:
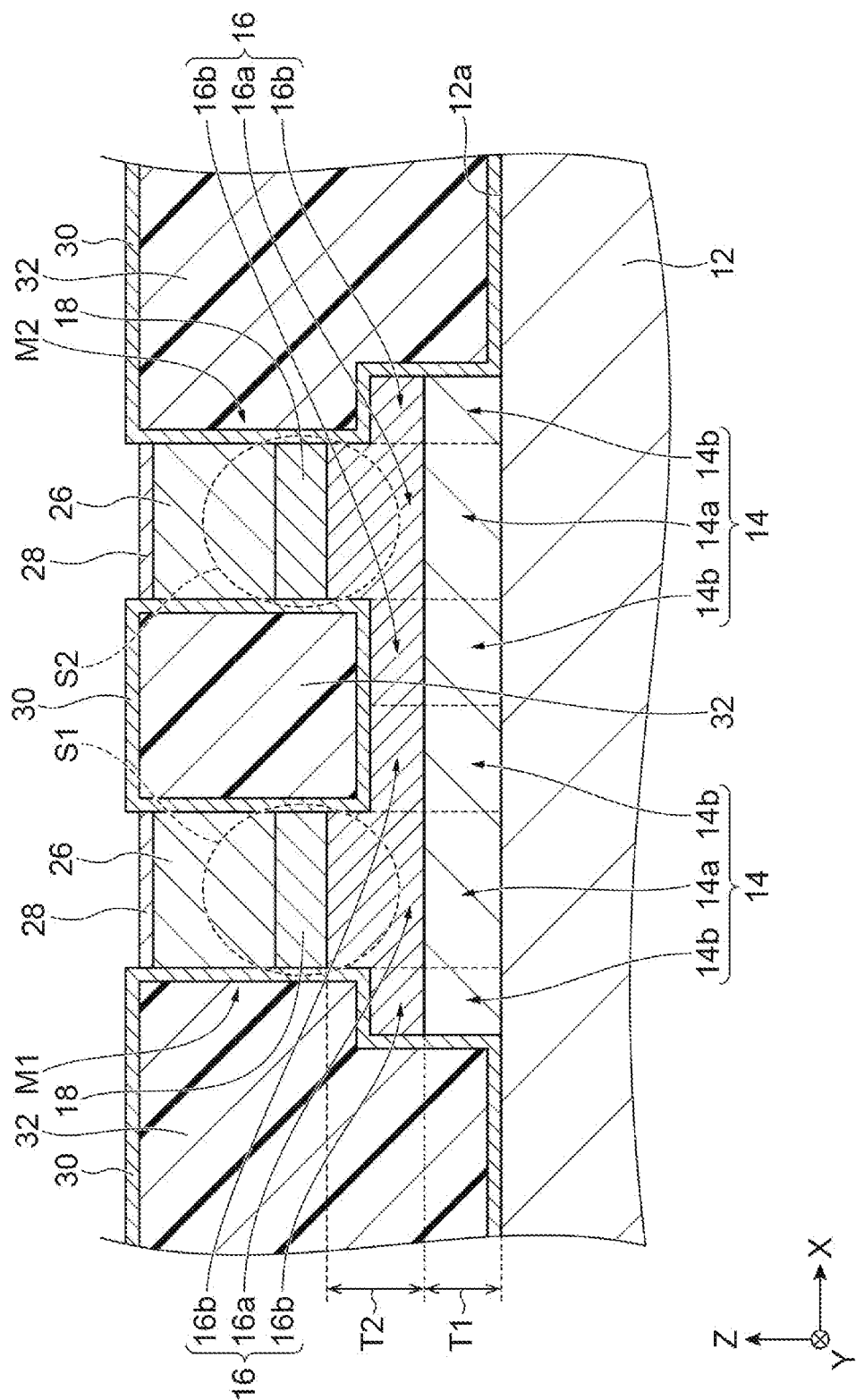
FIG. 3 is a cross-sectional view taken along line III-III of FIG. 1.
Figure 4:
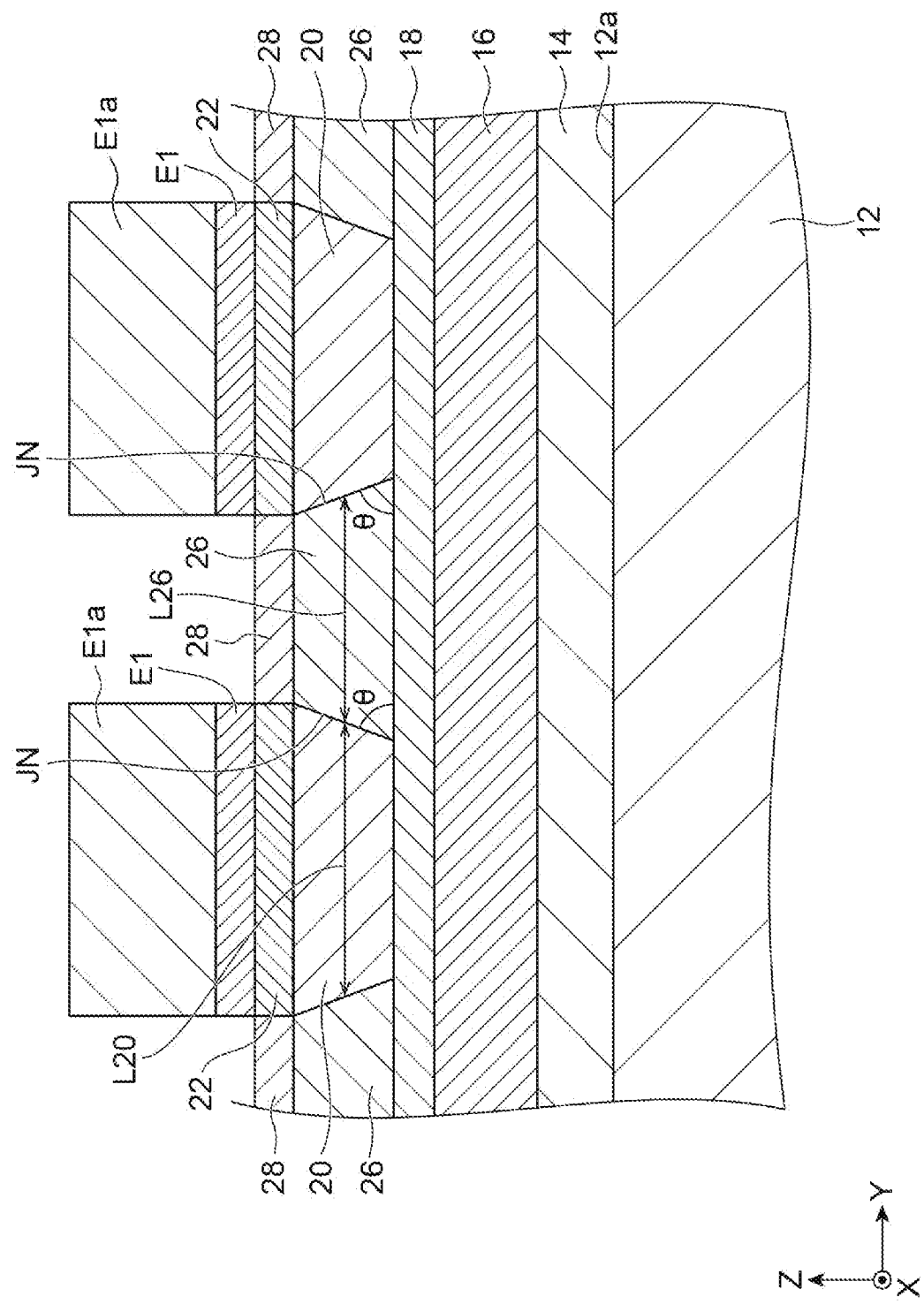
FIG. 4 is a cross-sectional view taken along line IV-IV of FIG. 1.

FIG. 2 is a cross-sectional view taken along line II-II of FIG. 1. FIG. 2 illustrates a cross-section of modulating portion M1m and modulating portion M2m. FIG. 3 is a cross-sectional view taken along line III-III of FIG. 1. FIG. 3 illustrates a cross section of separating portion M1s and separating portion M2s. FIG. 4 is a cross-sectional view taken along line IV-IV of FIG. 1. FIG. 4 illustrates a cross section of modulating portion M1m and separating portion M1s.

As illustrated in FIG. 2 to FIG. 4, first mesa waveguide M1 includes a p-type first semiconductor layer 16 provided over substrate 12, a core layer 18 provided over first semiconductor layer 16, a p-type second semiconductor layer 26 provided over core layer 18, and an n-type third semiconductor layer 20 provided over core layer 18. A semiconductor layer 14 may be provided between substrate 12 and first semiconductor layer 16. A p-type semiconductor layer 28 may be provided over second semiconductor layer 26. An n-type semiconductor layer 22 may be provided over third semiconductor layer 20.

Second semiconductor layer 26 and third semiconductor layer 20 are disposed adjacent to each other in the Y-axis direction. The plurality of second semiconductor layers 26 and the plurality of third semiconductor layers 20 may be arranged in the Y-axis direction. Second semiconductor layers 26 and third semiconductor layers 20 may be alternately arranged in the Y-axis direction. The number of third semiconductor layers 20 may correspond to the number of electrodes E1. A joining surface JN between second semiconductor layer 26 and third semiconductor layer 20 is inclined with respect to a plane (XZ plane) orthogonal to the Y-axis direction. That is, joining surface JN is inclined with respect to the Z-axis direction in the YZ cross section of first mesa waveguide M1. Joining surface JN is a surface of PN junction. In the present embodiment, joining surface JN is inclined such that the length L20 of third semiconductor layer 20 in the Y-axis direction becomes shorter from electrode E1 toward core layer 18. That is, joining surface JN is inclined such that the length L26 of second semiconductor layer 26 in the Y-axis direction increases from electrode E1 toward core layer 18. Joining surface JN is inclined by an angle (90°-θ) with respect to the XZ plane. That is, joining surface JN is inclined by the angle θ with respect to a main surface 12a of substrate 12. The angle θ may be from 50° to 60°. The angle θ can be controlled by the crystal orientation of the group III-V compound semiconductor included in second semiconductor layer 26. For example, when main surface 12a of substrate 12 is a (100) plane and second semiconductor layer 26 is epitaxially grown over main surface 12a, the angle θ may be 55°.

Joining surface JN may be inclined such that the length L20 of third semiconductor layer 20 in the Y-axis direction increases from electrode E1 toward core layer 18. That is, joining surface JN may be inclined such that a length L26 of second semiconductor layer 26 in the Y-axis direction becomes shorter from electrode E1 toward core layer 18.

In first mesa waveguide M1, electrode E1 is provided over third semiconductor layer 20. Semiconductor layer 22 may be disposed between third semiconductor layer 20 and electrode E1. Wiring line E1a is provided over electrode E1. In first mesa waveguide M1, electrode E1 and wiring line E1a are not provided over second semiconductor layer 26.

Similarly, in second mesa waveguide M2, an electrode E2 is provided over third semiconductor layer 20. Semiconductor layer 22 may be disposed between third semiconductor layer 20 and electrode E2. Wiring line E2a is provided over electrode E2. In second mesa waveguide M2, electrode E2 and wiring line E2a are not provided over second semiconductor layer 26.

As shown in FIG. 2, in modulating portion M1m and modulating portion M2m, semiconductor layer 14, first semiconductor layer 16, core layer 18, third semiconductor layer 20, and semiconductor layer 22 may be sequentially provided over main surface 12a of substrate 12. First semiconductor layer 16 constitutes a lower cladding layer. Third semiconductor layer 20 constitutes an upper cladding layer. Core layer 18 of first mesa waveguide M1 and core layer 18 of second mesa waveguide M2 are arranged to be spaced apart from each other in the X-axis direction. In the cross section of first mesa waveguide M1 orthogonal to the Y-axis direction, a spot S1 of light is formed over first semiconductor layer 16, core layer 18, and third semiconductor layer 20. In the cross section of second mesa waveguide M2 orthogonal to the Y-axis direction, a spot S2 of light is formed over first semiconductor layer 16, core layer 18, and third semiconductor layer 20.

As shown in FIG. 3, in separating portion M1s and separating portion M2s, semiconductor layer 14, first semiconductor layer 16, core layer 18, second semiconductor layer 26, and semiconductor layer 28 may be sequentially provided over main surface 12a of substrate 12. Second semiconductor layer 26 constitutes an upper cladding layer.

Substrate 12 is, for example, a semi-insulating semiconductor substrate. Substrate 12 includes a group III-V compound semiconductor doped with an insulating dopant. Substrate 12 includes, for example, InP doped with iron (Fe). The dopant concentration of substrate 12 may be from $1\times10^{17}$ cm$^{-3}$ to $1\times10^{18}$ cm$^{-3}$.

As shown in FIG. 2 and FIG. 3, semiconductor layer 14 includes a first portion 14a located between core layer 18 and substrate 12 and a pair of second portions 14b located on both sides of first portion 14a. First portion 14a and pair of second portions 14b extend in the Y-axis direction. Therefore, the width (length in the X-axis direction) of semiconductor layer 14 is larger than the width of core layer 18. Semiconductor layer 14 of first mesa waveguide M1 and semiconductor layer 14 of second mesa waveguide M2 are connected to each other. In the present embodiment, semiconductor layer 14 of first mesa waveguide M1 and semiconductor layer 14 of second mesa waveguide M2 are connected to each other to form a single semiconductor layer. Semiconductor layer 14 may not include the pair of second portions 14b. In this case, semiconductor layer 14 of first mesa waveguide M1 and semiconductor layer 14 of second mesa waveguide M2 can be electrically connected to each other by a semiconductor layer or a conductive layer provided between substrate 12 and semiconductor layer 14.

Semiconductor layer 14 may include a group III-V compound semiconductor doped with a p-type dopant. Semiconductor layer 14 includes, for example, InGaAs or InP doped with zinc (Zn). Semiconductor layer 14 has a dopant concentration greater than the dopant concentration of first semiconductor layer 16. The dopant concentration of semiconductor layer 14 may be ten times or more the dopant concentration of first semiconductor layer 16. The dopant concentration of semiconductor layer 14 may be $5\times10^{18}$ cm$^{-3}$ or more or $1\times10^{19}$ cm$^{-3}$ or more. A thickness T1 of semiconductor layer 14 is, for example, from 0.5 μm to 2.0 μm.

First semiconductor layer 16 includes a first portion 16a located between core layer 18 and semiconductor layer 14 and a pair of second portions 16b located on both sides of first portion 16a. The thickness of first portion 16a is greater than the thickness of second portion 16b. First portion 16a and pair of second portions 16b extend in the Y-axis direction. Therefore, the width of first semiconductor layer 16 is larger than the width of core layer 18. First semiconductor layer 16 of first mesa waveguide M1 and first semiconductor layer 16 of second mesa waveguide M2 are connected to each other. In the present embodiment, first semiconductor layer 16 of first mesa waveguide M1 and first semiconductor layer 16 of second mesa waveguide M2 are connected to each other to form a single semiconductor layer. First semiconductor layer 16 may not include the pair of second portions 16b.

First semiconductor layer 16 includes a group III-V compound semiconductor doped with a p-type dopant. First semiconductor layer 16 may include a semiconductor material different from the semiconductor material of semiconductor layer 14. First semiconductor layer 16 includes, for example, InP doped with Zn. The dopant concentration of first semiconductor layer 16 may be from $1\times10^{17}$ cm$^{-3}$ to $2\times10^{18}$ cm$^{-3}$. The thickness T2 of first semiconductor layer 16 (thickness of first portion 16a) may be larger than the thickness T1 of semiconductor layer 14, and may be, for example, from 1.0 μm to 3.0 μm.

Core layer 18 is an i-type semiconductor layer, that is, an undoped semiconductor layer. Core layer 18 may have a multiple quantum well structure. Core layer 18 includes, for example, an AlGaInAs-based group III-V compound semiconductor. The width of core layer 18 is, for example, 1.5 μm or less. The p-type dopant concentration in core layer 18 is, for example, $1\times10^{16}$ cm$^{-3}$ or less.

Third semiconductor layer 20 includes a group III-V compound semiconductor doped with an n-type dopant. Third semiconductor layer 20 includes, for example, InP doped with Si. The dopant concentration of third semiconductor layer 20 may be from $1\times10^{17}$ cm$^{-3}$ to $2\times10^{18}$ cm$^{-3}$. The thickness of third semiconductor layer 20 is, for example, from 1.0 μm to 3.0 μm.

Semiconductor layer 22 includes a group III-V compound semiconductor doped with an n-type dopant. Semiconductor layer 22 may include a semiconductor material different from the semiconductor material of third semiconductor layer 20. Semiconductor layer 22 includes, for example, InGaAs or InP doped with Si. Semiconductor layer 22 has a dopant concentration greater than that of third semiconductor layer 20. The dopant concentration of semiconductor layer 22 may be $1\times10^{18}$ cm$^{-3}$ or more or $1\times10^{19}$ cm$^{-3}$ or more. The thickness of semiconductor layer 22 is, for example, from 0.1 μm to 0.5 μm.

Second semiconductor layer 26 includes a group III-V compound semiconductor doped with a p-type dopant. Second semiconductor layer 26 may include the same semiconductor material as the semiconductor material of first semiconductor layer 16. Second semiconductor layer 26 includes, for example, InP doped with Zn. Second semiconductor layer 26 has a dopant concentration smaller than that of first semiconductor layer 16. The dopant concentration of second semiconductor layer 26 may be from $5\times10^{16}$ cm$^{-3}$ to $5\times10^{17}$ cm$^{-3}$, or from $5\times10^{16}$ cm$^{-3}$ to $1\times10^{17}$ cm$^{-3}$. Second semiconductor layer 26 may be thinner than T2 of first semiconductor layer 16, and may be, for example, from 1.0 μm to 3.0 μm.

Semiconductor layer 28 may include a group III-V compound semiconductor doped with a p-type dopant. Semiconductor layer 28 may include a semiconductor material different from the semiconductor material of second semiconductor layer 26. Semiconductor layer 28 includes, for example, InGaAs or InP doped with Zn. Semiconductor layer 28 has a dopant concentration smaller than that of first semiconductor layer 16. The dopant concentration of semiconductor layer 28 may be from $5\times10^{16}$ cm$^{-3}$ to $5\times10^{17}$ cm$^{-3}$, or from $5\times10^{16}$ cm$^{-3}$ to $1\times10^{17}$ cm$^{-3}$. The thickness of $10^{16}$ Semiconductor layer 28 is, for example, from 10 nm to 100 nm.

Electrode E1 is connected to semiconductor layer 22 of first mesa waveguide M1. Electrode E1 is in ohmic contact with semiconductor layer 22 of first mesa waveguide M1. Electrode E1 is connected to wiring line E1a. Similarly, electrode E2 is connected to semiconductor layer 22 of second mesa waveguide M2. Electrode E2 is in ohmic contact with semiconductor layer 22 of second mesa waveguide M2. Electrode E2 is connected to wiring line E2a. Each of electrodes E1 and E2 includes, for example, a Ni layer, a Ge layer, and an Au layer. A further electrode may be connected to semiconductor layer 14.

An insulating film 30 including, for example, an inorganic material may be provided over main surface 12a of substrate 12, the side surface of first mesa waveguide M1, and the side surface of second mesa waveguide M2. An embedded region 32 may be provided over insulating film 30 to embed first mesa waveguide M1 and second mesa waveguide M2. Embedded region 32 includes, for example, resin. Insulating film 30 may be provided over embedded region 32.

In optical modulator 10 of the present embodiment, an AC voltage is applied to electrode E1 and electrode E2 by drive circuit DR. For example, by applying a voltage to first mesa waveguide M1, the intensity or phase of the light propagating through core layer 18 of first mesa waveguide M1 is adjusted. Similarly, by applying a voltage to second mesa waveguide M2, the intensity or phase of the light propagating through core layer 18 of second mesa waveguide M2 is adjusted.

According to optical modulator 10 of the present embodiment, it is less likely for the p-type dopant in second semiconductor layer 26 and the p-type dopant in first semiconductor layer 16 to mutually diffuse. Therefore, diffusion of the p-type dopant in first semiconductor layer 16 and second semiconductor layer 26 toward core layer 18 can be suppressed. Therefore, the p-type dopant concentration of core layer 18 can be reduced.

As illustrated in FIG. 4, joining surface JN may be inclined such that the length L20 of third semiconductor layer 20 in the Y-axis direction decreases from electrode E1 toward core layer 18. In this case, even if an electric field leakage extending from the joining surface JN into the p-type second semiconductor layer 26 in the Y-axis direction occurs, the region in which the electric field spreads in the Y-axis direction can be reduced. Therefore, the length in the Y-axis direction of the region to which the voltage is applied in core layer 18 can be reduced.

When the p-type dopant in second semiconductor layer 26 has a concentration of $1 \times 10^{16}$ cm$^{-3}$ or more, the electric field leakage extending from joining surface JN into the p-type second semiconductor layer 26 in the Y-axis direction can be reduced. When the p-type dopant in second semiconductor layer 26 has a concentration of $1 \times 10^{17}$ cm$^{-3}$ or less, optical loss due to absorption of free carriers can be reduced in second semiconductor layer 26.

Hereinafter, various experiments performed to evaluate optical modulator 10 will be described. The experiments described below are not intended to limit the present disclosure.

(First Experiment)

The optical modulator of the first experiment has a structure illustrated in FIG. 1 to FIG. 4. Specifically, the optical modulator of the first experiment has the following structures:

Substrate 12:
  InP substrate doped with Fe (Fe concentration: from $1 \times 10^{17}$ cm$^{-3}$ to $1 \times 10^{18}$ cm$^{-3}$),
semiconductor layer 14: p-InGaAs contact layer,
  Zn-doped InGaAs layer (1.1 µm thick, Zn concentration $2 \times 10^{19}$ cm$^{-3}$),
first semiconductor layer 16: p-InP lower cladding layer,
  InP layer doped with Zn (first portion 16a is 1.5 µm thick, second portion 16b is 1 µm thick, and Zn concentration is from $5 \times 10^{17}$ cm$^{-3}$ to $2 \times 10^{18}$ cm$^{-3}$),
core layer 18: i-core layer,
  AlGaInAs/AlInAs multiple quantum wells (0.5 µm thick, 1.5 µm wide, and 15 µm between first mesa waveguide M1 core layer 18 and second mesa waveguide M2 core layer 18),
third semiconductor layer 20:
  Si-doped InP layer (Si-concentration from $5 \times 10^{17}$ cm$^{-3}$ to $2 \times 10^{18}$ cm$^{-3}$),
semiconductor layer 22:
  Si-doped InGaAs layer (Si-concentration $1 \times 10^{19}$ cm$^{-3}$ or more),
second semiconductor layer 26: p-InP upper cladding layer,
  InP layer doped with Zn (1.2 µm thick, Zn concentration from $1 \times 10^{17}$ cm$^{-3}$ to $5 \times 10^{17}$ cm$^{-3}$), and
semiconductor layer 28: p-InGaAs layer,
  Zn-doped InGaAs layer (50 nm thick, Zn concentration from $1 \times 10^{17}$ cm$^{-3}$ to $5 \times 10^{17}$ cm$^{-3}$).

SIMS (Secondary Ion Mass Spectrometry) measurement was performed on the optical modulator of the first experiment. The results are shown in FIG. 5.

Figure 5:
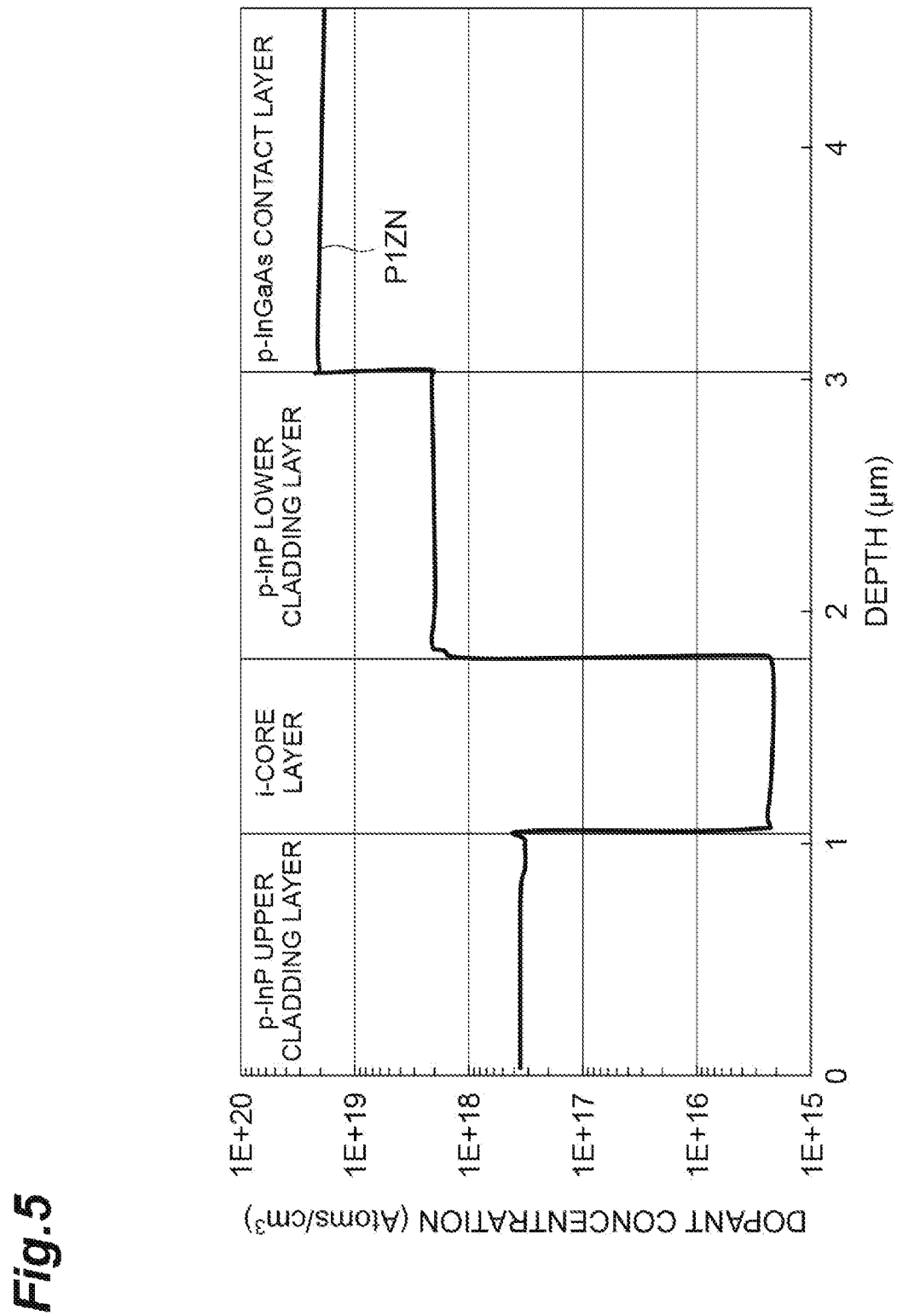
FIG. 5 is a graph showing a relationship between depth and dopant concentration in a first experiment.

FIG. 5 is a graph showing the relationship between depth and dopant concentration in the first experiment. In the graph, the vertical axis represents the dopant concentration. The dopant concentration is the Zn concentration. The horizontal axis represents the depth in a direction perpendicular to the main surface of the InP substrate. The position at which the depth becomes zero is the upper surface of the p-InGaAs layer. The graph shows a profile P1ZN of the Zn concentration. In the i-core layer, the Zn concentration was as small as $1 \times 10^{16}$ cm$^{-3}$ or less. It can be seen from the graph of FIG. 5 that Zn in the p-InP lower cladding layer and Zn in the p-InP upper cladding layer do not diffuse into the i-core layer.

(Second Experiment)

The optical modulator of the second experiment has the same structure as the optical modulator of the first experiment except that an SI (Semi-Insulating)-InP upper cladding layer and an SI-InGaAsP layer are provided instead of the p-InP upper cladding layer and the p-InGaAs layer, respectively. Each of the SI-InP upper cladding layer and the SI-InGaAsP layer contains Fe as a dopant.

SIMS measurement was performed on the optical modulator of the second experiment. The results are shown in FIG. 6.

Figure 6:
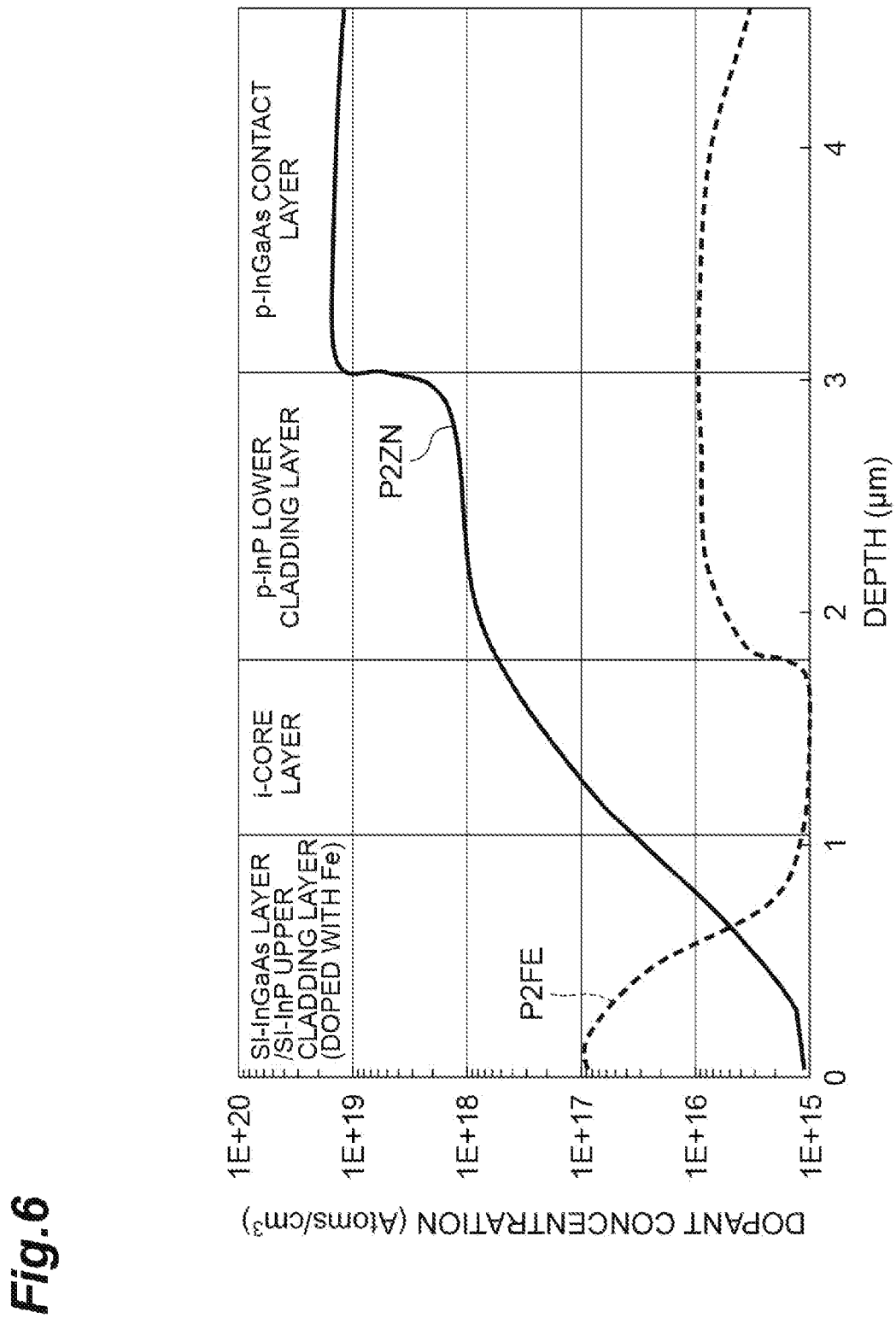
FIG. 6 is a graph showing a relationship between depth and dopant concentration in a second experiment.

FIG. 6 is a graph showing the relationship between the depth and the dopant concentration in the second experiment. In the graph, the vertical axis represents the dopant concentration. The dopant concentration is the Zn concentration or the Fe concentration. The horizontal axis represents the depth in a direction perpendicular to the main surface of the InP substrate. The position at which the depth becomes zero is the upper surface of the SI-InGaAsP layer. In the graph, a profile P2ZN of the Zn concentration and a profile P2FE of the Fe concentration are illustrated. In the core layer, the Zn concentration was greater than $1 \times 10^{16}$ cm$^{-3}$. From the graph of FIG. 6, it can be seen that Zn in the p-InP lower cladding layer diffuses into the i-core layer, and Fe in the SI-InP upper cladding layer diffuses into the p-InP lower cladding layer.

(Third Experiment)

In the third experiment, the electric field intensity distribution was calculated by simulation for the model structure corresponding to the region including second semiconductor layer 26 and the pair of third semiconductor layers 20 located on both sides of second semiconductor layer 26 in FIG. 4. The results are shown in FIG. 7.

Figure 7:
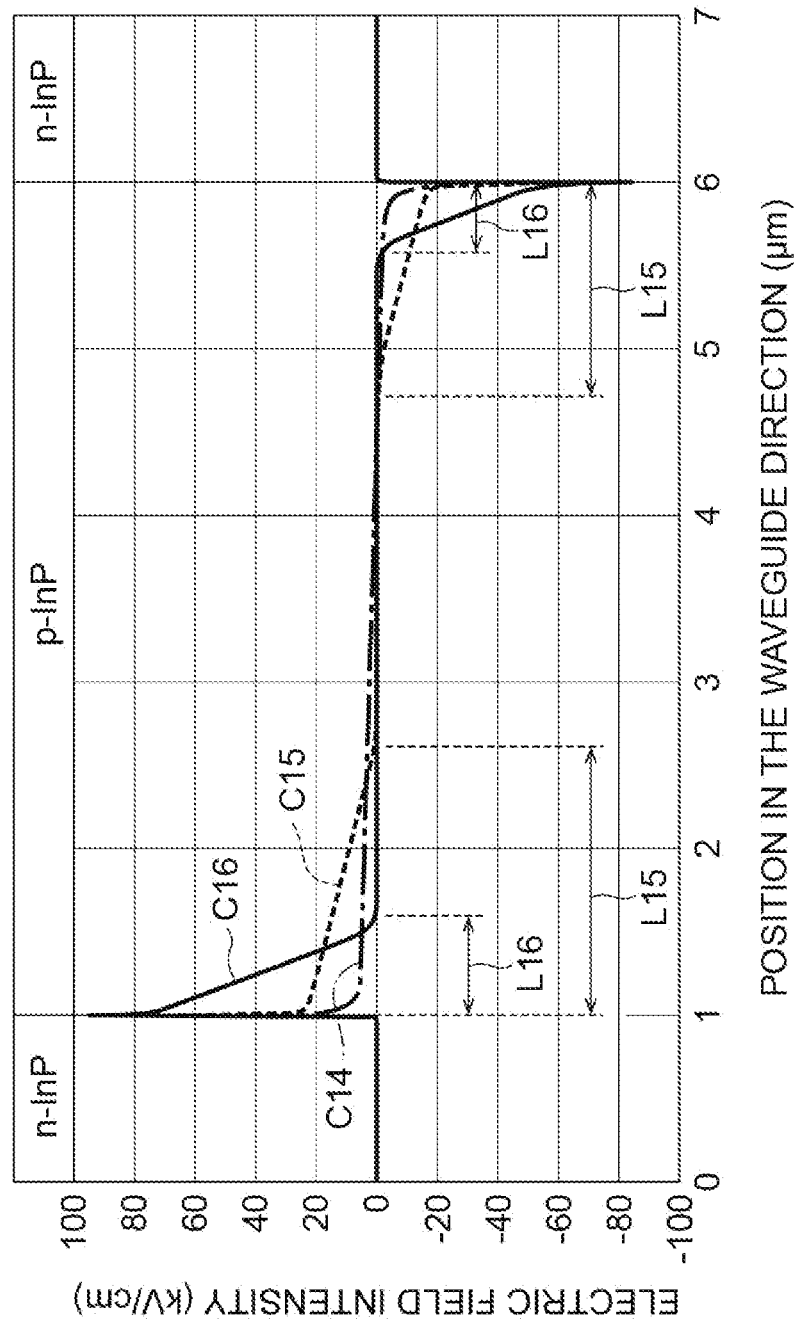
FIG. 7 is a graph showing an example of a relationship between the position in the waveguide direction and the electric field intensity.

FIG. 7 is a graph showing an example of the relationship between the position in the waveguide direction and the electric field intensity. In the graph, the vertical axis represents electric field intensity. The horizontal axis indicates the position in the waveguide direction (Y-axis direction). The model structure includes a pair of n-InP layers each having a length of 1 µm in the waveguide direction and a p-InP layer having a length of 5 µm in the waveguide direction. The Si concentration in each n-InP layer is $2 \times 10^{18}$ cm$^{-3}$. The acceptor concentration (Zn concentration) of the p-InP layer is $1 \times 10^{14}$ cm$^{-3}$, $1 \times 10^{15}$ cm$^{-3}$, or $1 \times 10^{16}$ cm$^{-3}$. The joining surface between each n-InP layer and p-InP layer is perpendicular to the waveguiding direction.

In the graph, a profile C14 indicates the electric field intensity distribution in the p-InP layer when the accepter concentration is $1 \times 10^{14}$ cm$^{-3}$. A profile C15 indicates an electric field intensity distribution in the p-InP layer when the accepter concentration is $1 \times 10^{15}$ cm$^{-3}$. A profile C16 shows the electric field intensity distribution in the p-InP layer when the accepter concentration is $1 \times 10^{16}$ cm$^{-3}$. When the concentration of acceptors is $1 \times 10^{15}$ cm$^{-3}$, an electric field leakage length L15 indicates the length in the waveguide direction of a region having an electric field intensity of 1% or more with respect to the peak of the electric field intensity. When the concentration of acceptors is $1 \times 10^{16}$ cm$^{-3}$, an electric field leakage length L16 indicates the length in the waveguide direction of a region having an electric field intensity of 1% or more with respect to the peak of the electric field intensity. It can be seen from the graph of FIG. 7 that the electric field leakage length becomes shorter as the acceptor concentration becomes higher.

Figure 8:
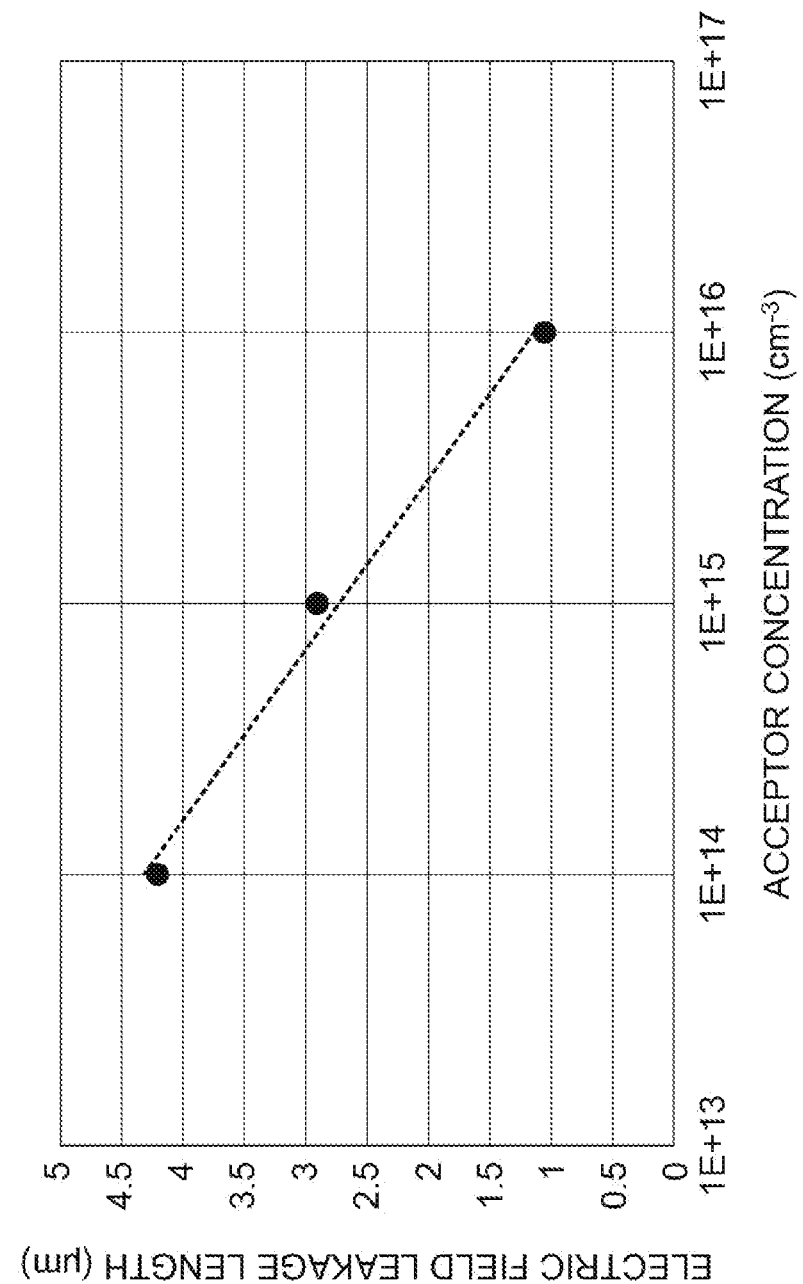
FIG. 8 is a graph showing an example of a relationship between acceptor concentration and electric field leakage length.

FIG. 8 is a graph showing an example of the relationship between the acceptor concentration and the electric field leakage length. In the graph, the vertical axis represents the electric field leakage length. The horizontal axis represents acceptor concentration. Electric field leakage L15 is about 3 µm. Electric field leakage L16 is about 1 µm. It can be seen from the graph of FIG. 8 that the electric field leakage length linearly decreases as the acceptor concentration increases. When the acceptor concentration is $1 \times 10^{16}$ cm$^{-3}$ or more, the electric field leakage is as small as 1 µm or less.

Hereinafter, a method of manufacturing an optical modulator according to a first embodiment will be described with reference to FIG. 9 to FIG. 15. Optical modulator 10 can be manufactured as follows.

(Formation of Semiconductor Stack)

Figure 9:
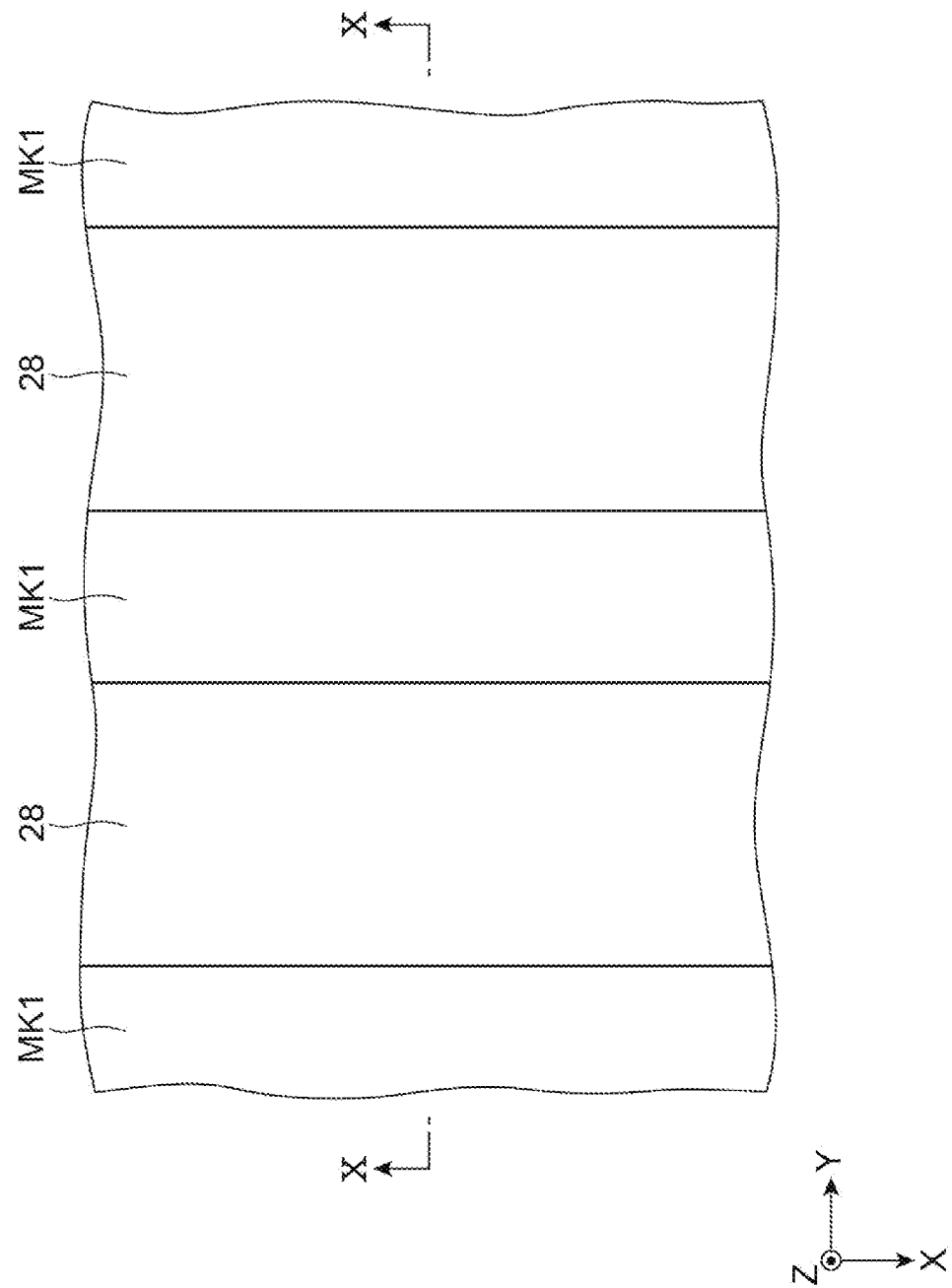
FIG. 9 is a plan view schematically illustrating one step of the method of manufacturing an optical modulator according to the first embodiment.
Figure 10:
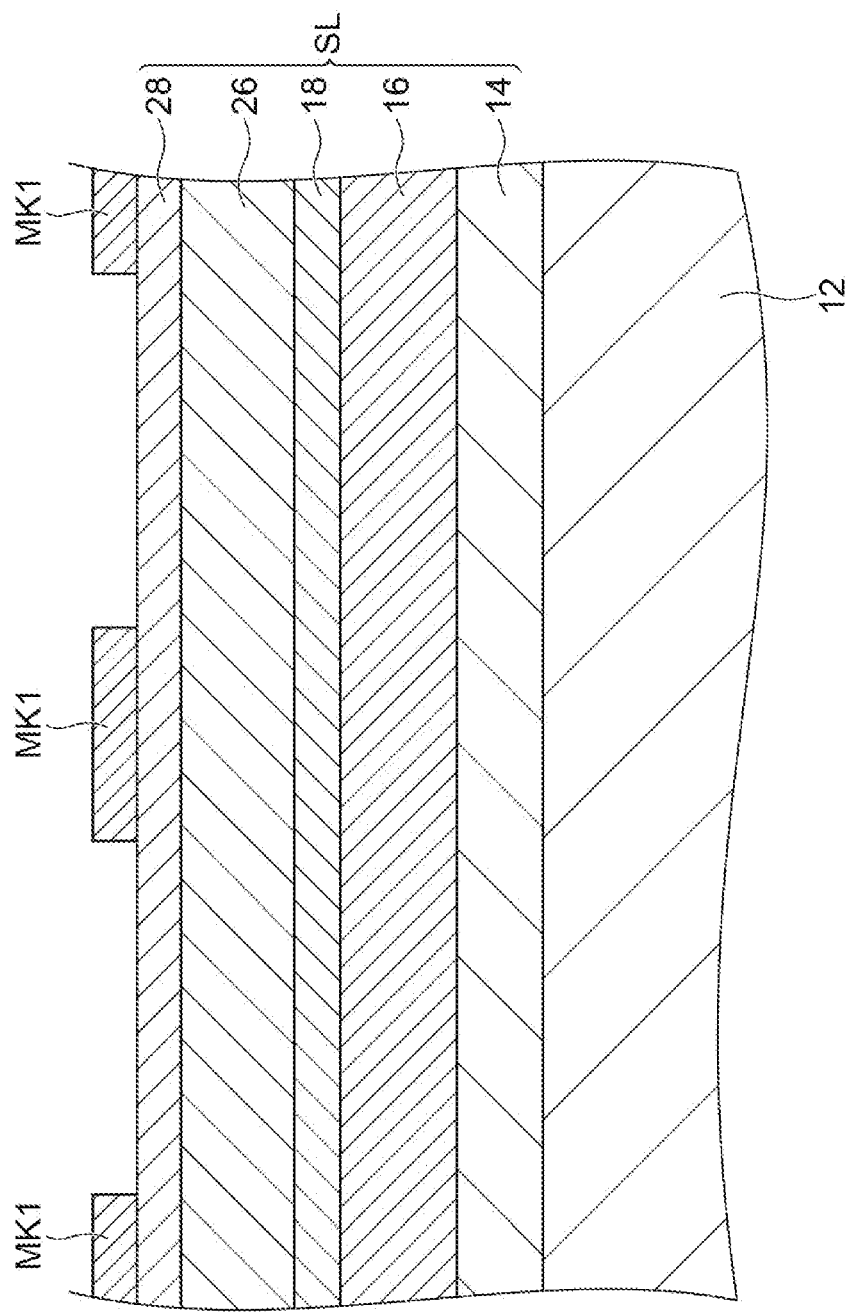
FIG. 10 is a cross-sectional view taken along line X-X of FIG. 9.

First, as shown in FIG. 9 and FIG. 10, a semiconductor stack SL is formed over substrate 12. Semiconductor stack SL includes a p-type first semiconductor layer 16 provided over substrate 12, core layer 18 provided over first semiconductor layer 16, and a p-type (first conductivity type) second semiconductor layer 26 provided over core layer 18. Semiconductor stack SL may include semiconductor layer 14 disposed between substrate 12 and first semiconductor layer 16. Semiconductor stack SL may include a p-type semiconductor layer 28 provided over second semiconductor layer 26. Each layer is formed by, for example, organometallic vapor phase epitaxy (OMVPE).

Next, a mask MK1 is formed over semiconductor stack SL. In the present embodiment, a plurality of masks MK1 extend in the X-axis direction and are arranged to be spaced apart from each other in the Y-axis direction. Mask MK1 may be formed by, for example, photolithography and etching.

(Wet-Etching of Second Semiconductor Layer)

Figure 11:
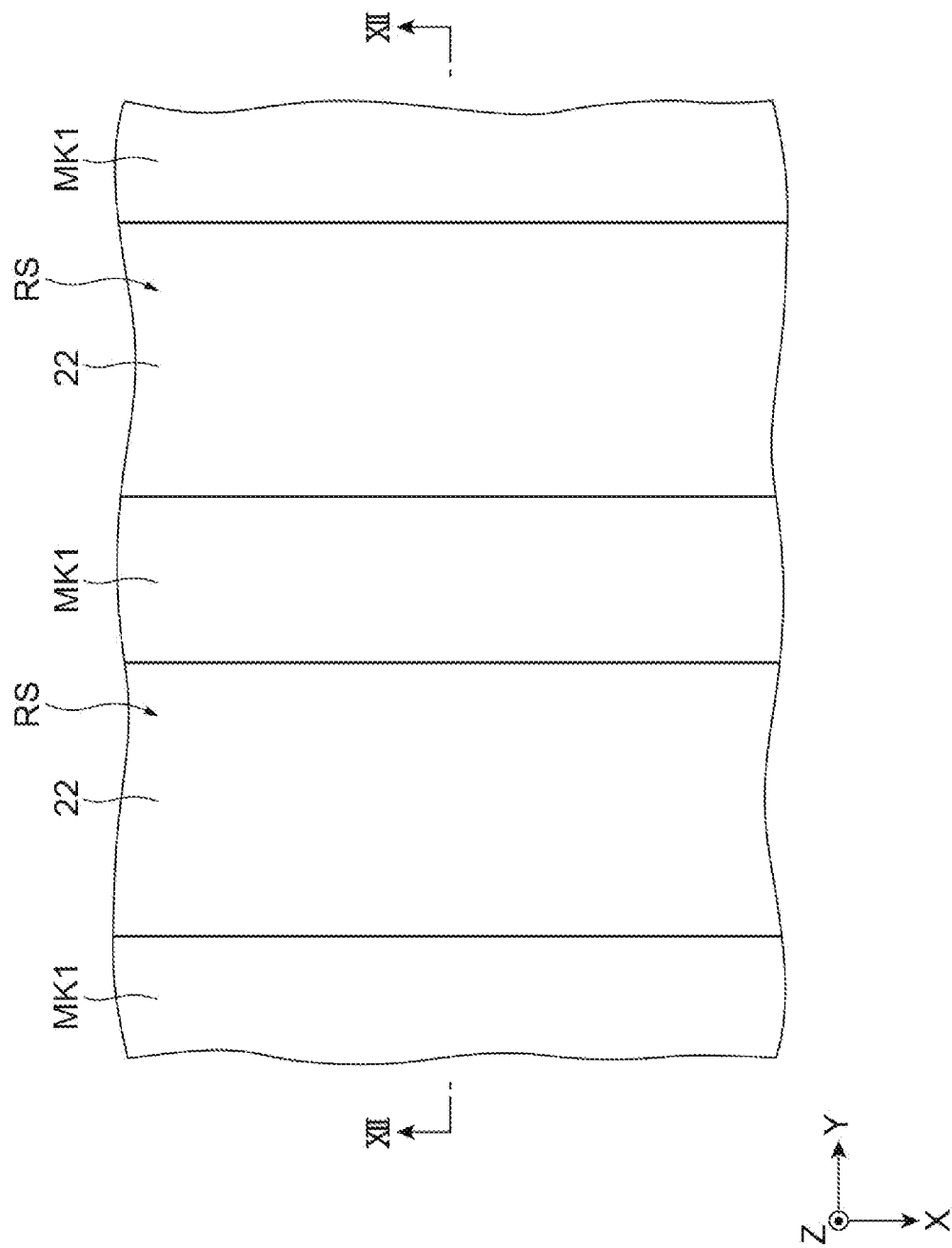
FIG. 11 is a plan view schematically illustrating one step of the method of manufacturing the optical modulator according to the first embodiment.
Figure 12:
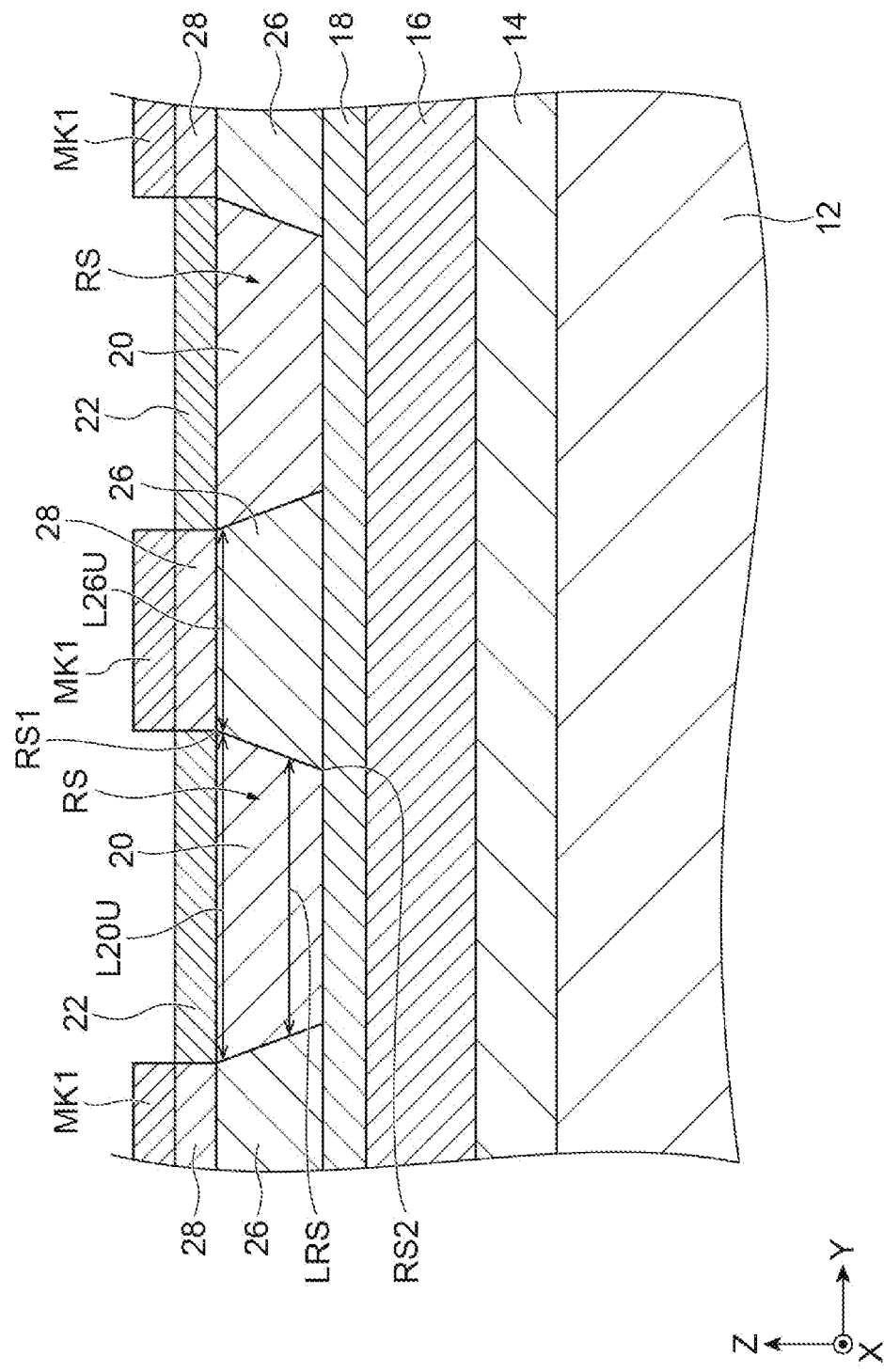
FIG. 12 is a cross-sectional view taken along line XII-XII of FIG. 11.

Next, as shown in FIG. 11 and FIG. 12, a recess RS is formed in second semiconductor layer 26 by wet-etching second semiconductor layer 26. Semiconductor layer 28 may also be wet-etched. Wet-etching is performed using mask MK1. Examples of etchants include aqueous solutions comprising hydrochloric acid and hydrogen peroxide. The length LRS of recess RS in the Y-axis direction decreases from an upper end RS1 toward a lower end RS2 of recess RS. That is, the side wall of recess RS has a forward tapered shape.

(Formation of Third Semiconductor Layer)

Next, as shown in FIG. 11 and FIG. 12, an n-type (second conductivity type opposite to the first conductivity type) third semiconductor layer 20 is formed in recess RS. Thereafter, semiconductor layer 22 may be formed over third semiconductor layer 20. Each layer is formed by metal organic chemical vapor deposition using, for example, mask MK1. Each layer may not be formed over mask MK1 by selective growth.

The length L20U of the upper surface of third semiconductor layer 20 in the Y-axis direction may be larger than the length L26U of the upper surface of second semiconductor layer 26 in the Y-axis direction. In this case, the flatness of the upper surface of third semiconductor layer 20 can be improved.

(Formation of First Mesa Waveguide and Second Mesa Waveguide)

Figure 13:
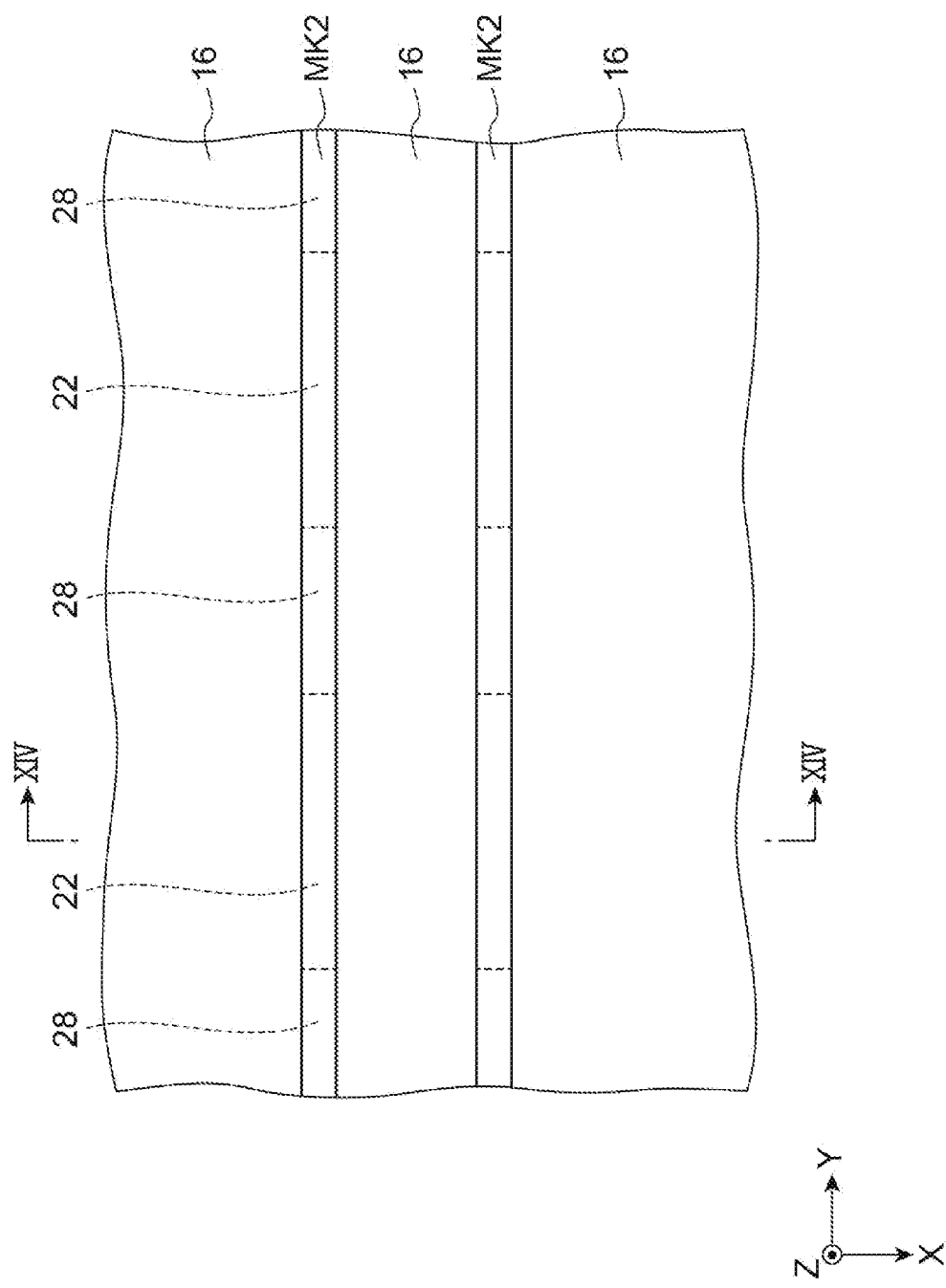
FIG. 13 is a plan view schematically illustrating one step of the method of manufacturing the optical modulator according to the first embodiment.
Figure 14:
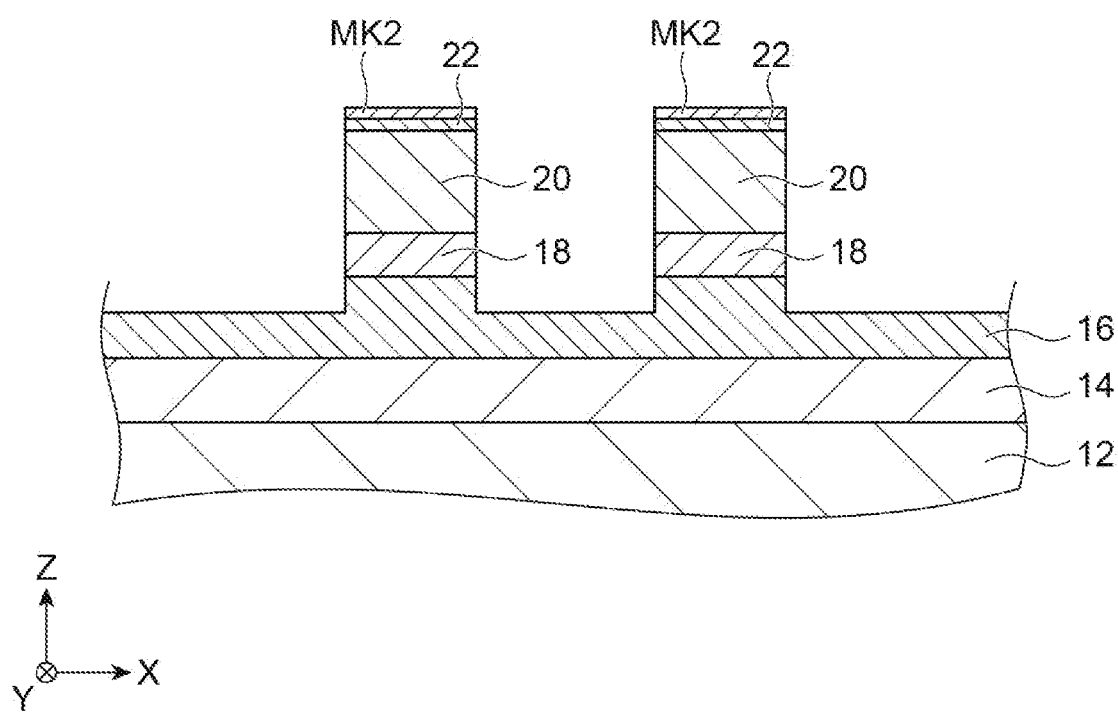
FIG. 14 is a cross-sectional view taken along line XIV-XIV of FIG. 13.

Next, as shown in FIG. 13 to FIG. 15, first mesa waveguide M1 and second mesa waveguide M2 are formed by etching second semiconductor layer 26, third semiconductor layer 20, core layer 18, and first semiconductor layer 16. Semiconductor layer 22 and semiconductor layer 28 may also be etched. First mesa waveguide M1 and second mesa waveguide M2 may be formed by photolithography and dry etching. First, as shown in FIG. 13 and FIG. 14, a mask MK2 is used while etching second semiconductor layer 26, semiconductor layer 28, third semiconductor layer 20, semiconductor layer 22, core layer 18, and first semiconductor layer 16. First semiconductor layer 16 is partially etched. In the present embodiment, the pair of masks MK2 extend in the Y-axis direction and are arranged to be separated from each other in the X-axis direction. Next, as shown in FIG. 15, first semiconductor layer 16 and semiconductor layer 14 are etched using a mask MK3 extending in the Y-axis direction. The width of mask MK3 in the X-axis direction is larger than the width of mask MK2 in the X-axis direction. Thus, first mesa waveguide M1 and second mesa waveguide M2 are formed.

Next, as shown in FIG. 2 and FIG. 3, insulating film 30 is formed to cover first mesa waveguide M1 and second mesa waveguide M2. Then, a resin is coated over insulating film 30 to form embedded region 32. Then, insulating film 30 is formed over embedded region 32.

(Formation of Electrode)

Next, as shown in FIG. 2 and FIG. 4, electrode E1 is formed over first mesa waveguide M1. Electrode E1 is formed over the n-type third semiconductor layer 20 and is not formed over the p-type second semiconductor layer 26.

Electrode E1 may be formed over semiconductor layer 22. Similarly, as shown in FIG. 2, electrode E2 is formed over second mesa waveguide M2. Electrode E2 is formed over the n-type third semiconductor layer 20 and is not formed over the p-type second semiconductor layer 26. Electrode E2 may be formed over semiconductor layer 22.

Next, wiring line E1a and wiring line E2a are formed over electrode E1 and electrode E2, respectively. At the same time, wiring line E1b, wiring line E2b, electrode pad EP1 and electrode pad EP2 are also formed. The wiring line and the electrode pad may be formed by, for example, photolithography, dry etching, vapor deposition, and lift-off.

In the manufacturing method described above, the order of forming second semiconductor layer 26 and third semiconductor layer 20 may be reversed. In this case, in the forming the semiconductor stack, semiconductor stack SL includes an n-type (first conductivity type) third semiconductor layer 20 (second semiconductor layer) provided over core layer 18. In the wet-etching the second semiconductor layer, a recess is formed in third semiconductor layer 20 by wet-etching third semiconductor layer 20. In the forming the third semiconductor layer, a p-type (second conductivity type) second semiconductor layer 26 is formed in the recess. In this case, joining surface JN shown in FIG. 4 is inclined such that the length L20 of third semiconductor layer 20 in the Y-axis direction increases from electrode E1 toward core layer 18.

Second Embodiment

Figure 16:
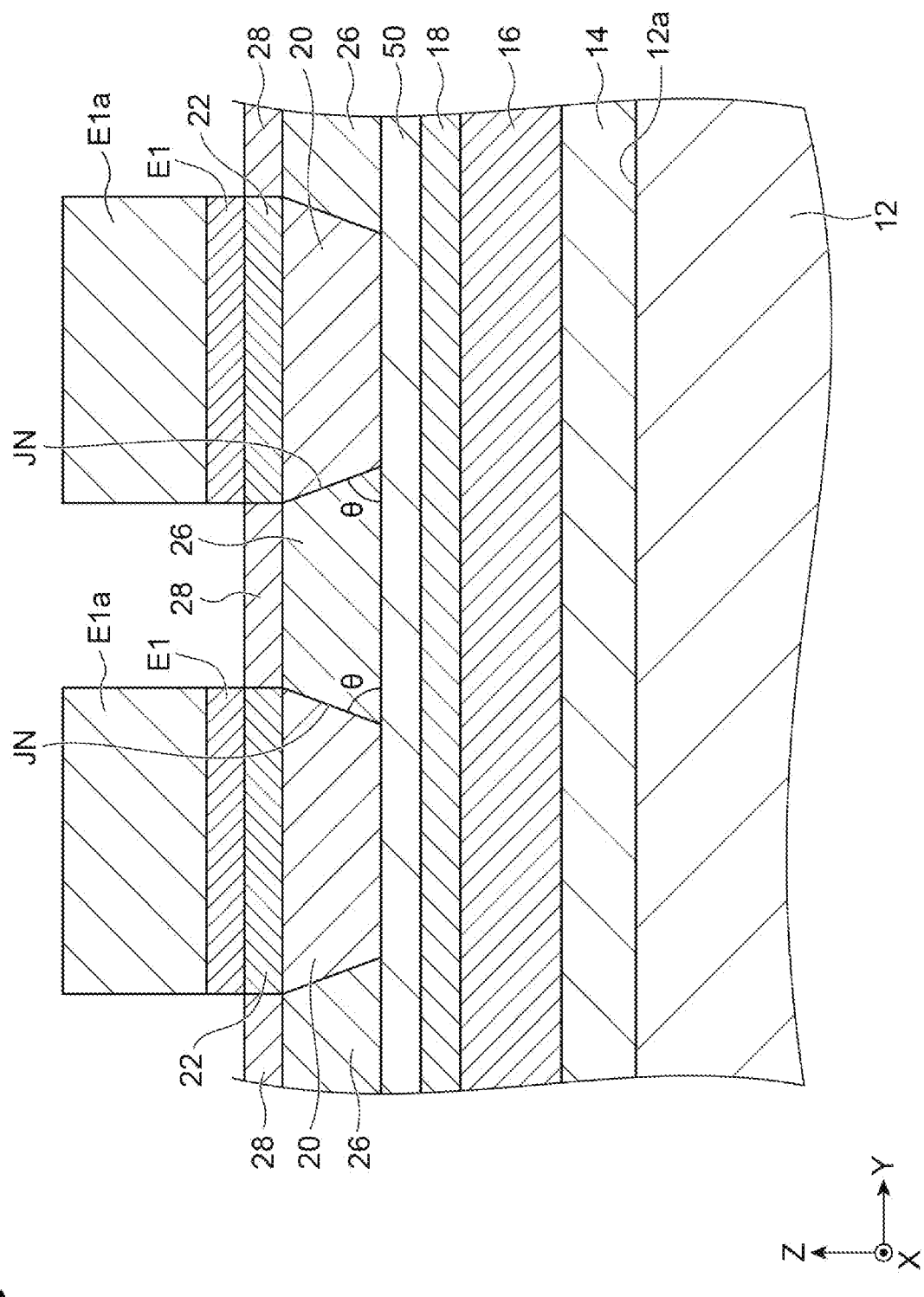
FIG. 16 is a cross-sectional view schematically illustrating a part of the optical modulator according to the second embodiment.

FIG. 16 is a cross-sectional view schematically illustrating a part of the optical modulator according to the second embodiment. The optical modulator shown in FIG. 16 has the same configuration as that of optical modulator 10 of the first embodiment except that it further includes an etching stop layer 50.

Etching stop layer 50 may function as an etching stop layer when wet-etching second semiconductor layer 26. Etching stop layer 50 includes a group III-V compound semiconductor such as InGaAsP.

In this embodiment, the same effects as those of the first embodiment can be obtained. Etching stop layer 50 can prevent core layer 18 from being etched when wet-etching second semiconductor layer 26 or third semiconductor layer 20.

Although the preferred embodiments of the present disclosure have been described in detail above, the present disclosure is not limited to the above embodiments. The constituent elements of the embodiments may be arbitrarily combined.

The embodiments disclosed herein are to be considered in all respects as illustrative and not restrictive. The scope of the present invention is not limited by the above-described embodiments but is defined by the claims, and is intended to include meanings equivalent to the scope of claims and all modifications within the scope.

What is claimed is:

1. An optical modulator comprising:
   a first mesa waveguide extending in a first direction, wherein the first direction is an optical axis direction; and
   a second mesa waveguide,
   wherein the first mesa waveguide includes a p-type first semiconductor layer disposed over a substrate, a core layer disposed over the p-type first semiconductor layer, a p-type second semiconductor layer disposed over the core layer, and an n-type third semiconductor layer disposed over the core layer, and
      wherein the p-type second semiconductor layer and the n-type third semiconductor layer are arranged adjacent to each other in the first direction;
   an electrode is disposed over the n-type third semiconductor layer; and
   a joining surface between the p-type second semiconductor layer and the n-type third semiconductor layer is inclined with respect to a surface orthogonal to the first direction at an angle of 50° or more to 60° or less.

2. The optical modulator according to claim 1, wherein the joining surface is inclined such that a length of the n-type third semiconductor layer in the first direction is decreased in a direction from the electrode toward the core layer.

3. The optical modulator according to claim 1, wherein a p-type dopant in the p-type second semiconductor layer has a concentration of $1\times10^{16}$ $cm^{-3}$ or more.

4. The optical modulator according to claim 1, wherein a p-type dopant in the p-type second semiconductor layer has a concentration of $1\times10^{17}$ $cm^{-3}$ or less.

5. The optical modulator according to claim 1, wherein the p-type second semiconductor layer includes semiconductor material same as semiconductor material of the p-type first semiconductor layer.

6. The optical modulator according to claim 1, wherein the p-type second semiconductor layer includes InP doped with Zn.

7. The optical modulator according to claim 1, wherein a p-type dopant in the p-type second semiconductor layer has a concentration smaller than a concentration of a p-type dopant of the p-type first semiconductor layer.

8. The optical modulator according to claim 1, wherein the p-type second semiconductor layer has a thickness smaller than a thickness of the p-type first semiconductor layer.

9. The optical modulator according to claim 1, wherein a thickness of the p-type second semiconductor layer is from 1.0 μm to 3.0 μm.

10. The optical modulator according to claim 1, wherein the first mesa waveguide further comprises a fourth semiconductor layer disposed over the p-type second semiconductor layer.

11. The optical modulator according to claim 10, wherein the fourth semiconductor layer includes a semiconductor material different from a semiconductor material of the p-type second semiconductor layer.

* * * * *